(12) United States Patent
Arai et al.

(10) Patent No.: US 6,947,277 B2
(45) Date of Patent: Sep. 20, 2005

(54) SURFACE MOUNT TYPE CAPACITOR CAPABLE OF SUFFICIENTLY PREVENTING ELECTROMAGNETIC WAVE NOISE PROPAGATION

(75) Inventors: Satoshi Arai, Sendai (JP); Masahiko Takahashi, Sendai (JP); Naoki Wako, Sendai (JP)

(73) Assignee: NEC TOKIN Corporation, Tokyo (JP)

( * ) Notice: Subject to any disclaimer, the term of this patent is extended or adjusted under 35 U.S.C. 154(b) by 0 days.

(21) Appl. No.: 11/048,565

(22) Filed: Feb. 1, 2005

(65) Prior Publication Data

US 2005/0168920 A1 Aug. 4, 2005

(30) Foreign Application Priority Data

Feb. 3, 2004 (JP) .............................. 2004/026500

(51) Int. Cl.⁷ .............................. H01G 9/04; H01G 2/12
(52) U.S. Cl. ...................................... 361/528; 361/532
(58) Field of Search ........................ 361/523, 528–529, 361/532–536, 538, 540

(56) References Cited

U.S. PATENT DOCUMENTS

| | | | |
|---|---|---|---|
| 6,717,793 B2 * | 4/2004 | Arai et al. | 361/306.1 |
| 2004/0105218 A1 * | 6/2004 | Masuda et al. | 361/523 |
| 2004/0174660 A1 * | 9/2004 | Arai et al. | 361/523 |

FOREIGN PATENT DOCUMENTS

JP  2002-313676 A  10/2002

\* cited by examiner

*Primary Examiner*—Eric W. Thomas
(74) *Attorney, Agent, or Firm*—Frishauf, Holtz, Goodman & Chick, P.C.

(57) ABSTRACT

A surface mount type capacitor includes an anode section having an anode portion and first and second leads, cathode section including a cathode portion, first and second anode terminals, a cathode terminal, and a metal member. The capacitor further has an additional terminal electrically connected to the metal member and to be grounded to an object to which the capacitor is to be mounted.

9 Claims, 5 Drawing Sheets

SURFACE MOUNT TYPE CAPACITOR CAPABLE OF SUFFICIENTLY PREVENTING ELECTROMAGNETIC WAVE NOISE PROPAGATION

This application claims priority to prior Japanese application No. JP 2004-26500, the disclosure of which is incorporated herein by reference.

BACKGROUND OF THE INVENTION

This invention relates to a surface mount type capacitor to be mounted on a circuit board and mainly used as a noise filter.

Recently, along with performance improvements, a downsizing, and reductions in weight in electronic devices, the downsizing of a power supply using such electronic devices therein has been rapidly in progress. The power supply can be further downsized by heightening the working or operating frequency thereof.

With a rise in the operating frequency, a countermeasure against noise induced has to be taken. Among various components used in power supply, the performance requirements for a noise filter have been increasingly becoming severe. Such requirements also come from the utility devices because, with a rise in the switching rates of digital electronic devices, it is increasingly needed to decouple a wide range of high frequency components generated in the devices from power lines.

As such a noise filter, a surface mount type capacitor employing solid electrolytic material has been developed and put into practical use. Such a surface mount type solid electrolytic capacitor has an anode made of valve function metal such as aluminum and a cathode made of a functional polymeric material having high electrical conductivity as a solid electrolytic material. The solid electrolytic capacitor has an ESR (Equivalent Series Resistance) of $1/20$ to $1/50$ of that of the nonsolid electrolytic capacitor such as an aluminum electrolytic capacitor or tantalum electrolytic capacitor.

As such a surface mount type solid electrolytic capacitor, there is a capacitor having a structure of a distributed constant transmission line type and three terminals. This capacitor is often called a three-terminal or a triode noise filter. The capacitor has an anode section, a cathode section, first and second anode terminals, and a cathode terminal. The anode section is provided with an anode portion and first and second leads. The cathode section comprises a cathode formed on a solid dielectric film over a peripheral surface of the anode section except the first and the second leads, respectively. The first and the second anode terminals are electrically connected to lower sides of the first and the second leads, respectively. The cathode terminal is electrically connected to a lower side surface of the cathode section.

Use is made of the capacitor as a noise filter in such a way that the first and the second anode terminals are electrically connected between a DC power line of a utility device and a power supply line of a power supply on a circuit board. The cathode terminal is electrically connected to the ground of the circuit board.

High frequency components of voltages or currents appearing in either the DC power line of the utility devices or the power supply line of the power supply are filtered and eliminated through the capacitor, resulting in substantially noise-reduced voltages or currents in the opposite anode terminals.

However, in case that such a surface mount type capacitor is used in a high frequency region such as more than 100 MHz, an electromagnetic wave noise may be radiated from the first or the second anode terminal. The radiated noise may be transmitted in the resin package and the air. The propagated noise may attain to and may be input into the second or the first anode terminals. This is because the first and the second leads are electromagnetically exposed. The input noise interfere with and deteriorates the noise-filtering performance of the capacitor.

As a solution of the above-mentioned disadvantage, Japanese Unexamined Patent Application Publication (JP-A) No. 2002-313676 by applicant discloses a surface-mounting type capacitor having a metal plate which is electrically connected to an upper side of a cathode section and covers first and second leads. The metal plate serves to suppress or control the behavior of the propagation of the electromagnetic wave noise.

The disclosed surface mount type capacitor can prevent the electromagnetic wave noise considerably but a further noise reduction is desirable in a higher and wider frequency range with the increased operating frequency of the utility devices.

SUMMARY OF THE INVENTION

It is therefore an object of this invention to provide a surface-mounting type capacitor capable of sufficiently preventing propagation of electromagnetic wave noise and excellently performing the noise filtering performance.

According to this invention, there is provided a surface-mounting type capacitor comprising an anode section having an anode portion and first and second leads, first and second anode terminals electrically connected to the first and the second leads, respectively, a cathode section including a cathode portion opposed to a dielectric layer formed on the anode portion, a cathode terminal electrically connected to the cathode portion, and a metal member formed on the cathode portion in such a manner that the metal member covers an entire upper surface of the cathode portion. The capacitor may comprise an additional terminal electrically connected to the metal member and to be grounded to an object to which the surface mount type capacitor is to be mounted.

In one aspect of the invention, the metal member may be arranged to cover the first and the second leads and the first and the second anode terminals.

In another aspect of the invention, the metal member may have a substantially planar plate portion and downward directed portions extended from the substantially planar plate portion. The downward directed portions may serve as the additional terminal.

Still further structures and advantages of this invention will become clear as the description proceeds.

DESCRIPTION OF THE PREFERRED EMBODIMENTS

To facilitate an understanding of this invention, the prior art mentioned in the background of the specification will be described first.

Figure 1:
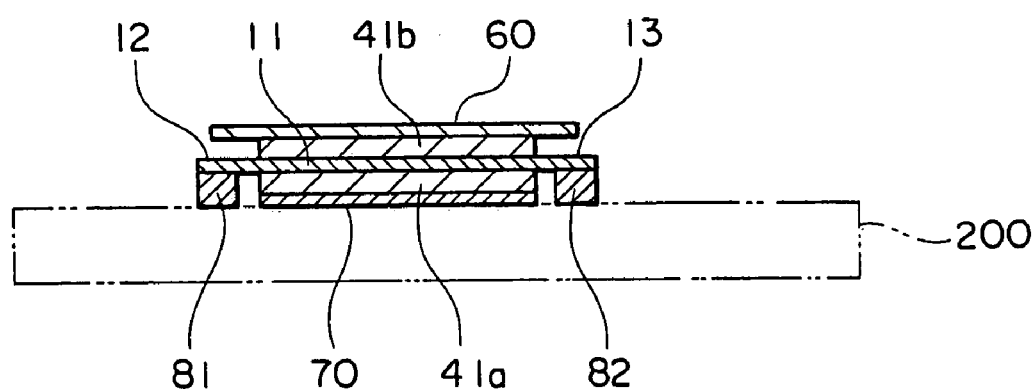
FIG. 1 is a cross sectional view showing a prior art surface-mounting type capacitor.

Referring to FIG. 1, a prior art surface-mounting type capacitor is of the solid electrolytic capacitor type and comprises an anode section, a cathode section, first and second anode terminals 81 and 82, and a cathode terminal 70. The anode section is provided with an anode portion 11 and first and second leads 12 and 13. The cathode section includes lower and upper cathode portions 41a and 41b. The lower and the upper cathode portions 41a and 41b are formed on a solid dielectric film (not shown) over a peripheral surface of the anode section except the first and the second leads 12 and 13, respectively. The first and the second anode terminals 81 and 82 are electrically connected to lower sides of the first and the second leads 12 and 13, respectively. The cathode terminal 70 is electrically connected to a lower side surface of the lower cathode portion 41a.

The prior art capacitor further comprises a metal plate 60. The metal plate 60 is electrically connected to an upper side of the upper cathode portion 41b and covers the first and the second leads 12 and 13. The metal plate 60 serves to suppress or control the behavior of the propagation of the electromagnetic wave noise.

The surface-mounting type capacitor mentioned above has the advantages and the disadvantages described in the background of the invention in this specification.

Next, preferred embodiments of this invention will be described with reference to the drawings.

First Embodiment

Figure 2A:
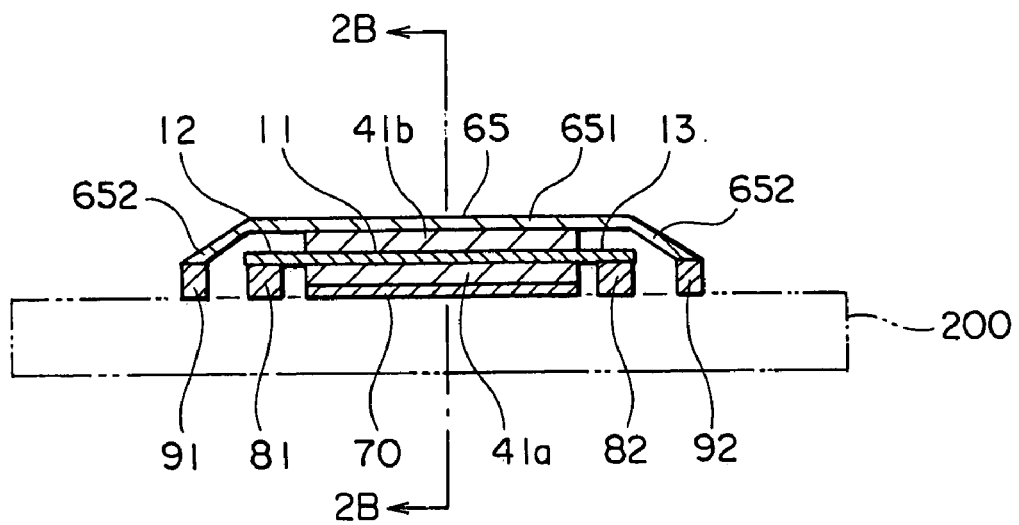
FIGS. 2A and 2B are a longitudinal cross sectional view of a surface-mounting type capacitor according to a first embodiment of this invention and a transversal cross sectional view along a line 2B—2B of FIG. 2A, respectively.
Figure 2B:
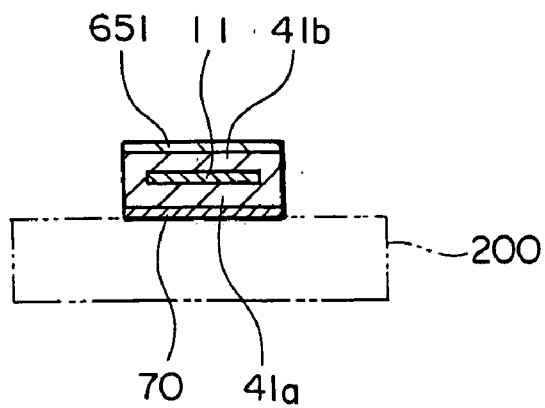

Referring to FIGS. 2A and 2B, a surface mount type capacitor according to a first embodiment of this invention is of a solid electrolytic capacitor type and comprises an anode section provided with an anode, or an anode portion 11, and first and second leads 12 and 13, a cathode section including a cathode portion which has lower and upper cathode portions 41a and 41b, and a dielectric film (not shown) respectively interposed between the anode portion 11 and the lower and the upper cathode portions 41a and 41b.

The anode section is made of a valve function metal such as aluminum and has a foil or a planar shape. The first and the second leads 12 and 13 extend from the anode portion 11 in both of the length directions, on a surface of which the dielectric film is formed. The dielectric film is made of an oxide of the valve function metal such as an aluminum oxide providing a high dielectric constant.

The lower and the upper cathode portions 41a and 41b have a cathode, or a cathode layer, formed on the dielectric film, and conductive films formed on the cathode layer. The cathode layer is made of a solid electrolyte material such as a high polymer molecule compound of high conductivity, or a conductive polypyrrole material. The conductive films are made of a graphite layer and a silver paste layer.

The first and the second anode terminals 81 and 82 are welded and electrically connected on the lower surfaces of the first and second leads 12 and 13, respectively. The first and the second anode terminals 81 and 82 provide connections to a circuit arranged on a circuit board 200. On the other hand, a cathode terminal 70 is provided on the lower surface of the conductive film of the cathode section by a solder layer.

The first and the second anode terminals 81 and 82 and the cathode terminal 70 are of a planar shape on the faces thereof opposing to a plane of the circuit board 200.

More specifically, the anode section has front and back side surfaces (as shown in FIG. 2A) opposite to each other in a width direction thereof, a first and second end surfaces opposite to each other in a length direction thereof, and a lower and upper planar surfaces opposite to each other in a thickness direction thereof.

The first and the second anode terminals 81 and 82 are made of copper. The cathode terminal 70 is also made of copper. The first and the second anode terminals 81 and 82 are electrically connected to lands of the circuit board 200 of a utility device such as a power supply. The cathode terminal 70 is electrically grounded to the circuit board 200.

The surface mount type capacitor further comprises a metal member or metal plate 65 made of copper. The metal plate 65 is electrically connected to an upper surface of the upper cathode portion 41b. The metal plate 65 is longer than the length of the anode section in the length direction. In addition, the metal plate 65 may be wider than the width of the anode section in the width direction.

The surface mount type capacitor further comprises a first additional terminal 91 electrically connected to the lower side of one end of the metal plate 65 in the length direction and a second additional terminal 92 electrically connected to the lower side of the other end of the metal plate 65 in the length direction. The first and the second additional terminals 91 and 92 may be electrically connected to the ground pattern of the circuit board 200.

Respective surfaces of the first and the second anode terminals 81 and 82, the cathode terminal 70, and the first and the second additional terminals 91 and 92 are on a level with one another in the thickness direction. Consequently, the surface mount type capacitor can be mounted on the circuit board 200 by an automated-mounting apparatus.

In order to prevent cathode-related elements and anode-related-elements from short-circuiting to one another, the capacitor may be packaged with electrical insulation resin (not shown). Alternatively, an electrical insulation film (not shown) may be formed on the lower and the upper cathode portions 41a and 41b.

In case that the surface mount capacitor of the invention is used as a noise filter, the capacitor is mounted on a circuit board so that the first and second anode terminals 81 and 82 are connected between a power line of high speed switching circuits (not shown) and a power supply line of a power supply (not shown), respectively, and the cathode terminal and the additional terminal are grounded on a ground line. In this arrangement, high frequency components of a voltage caused by switching operation and appearing on the power line of the high speed switching circuits are filtered out and eliminated through this distributed constant type filter which prevents the high frequency components from transmitting to the power supply line of the power supply.

The metal plate 65 is extended over the first and the second leads 12 and 13 and therefore covers the whole of the first and the second leads 12 and 13. Namely, the metal plate 65 has a substantially planar plate portion 651 and downward directed portions 652 extended from the planar plate portion 651. Furthermore, the downward directed portions 652 are electrically connected to the first and the second additional terminals 91 and 92 which can be electrically connected to the ground of the circuit board 200, respectively. Consequently, the metal plate 65 can more sufficiently suppress or control the behavior of the propagation of the electromagnetic wave noise in the vicinity of the first and the second leads 12 and 13, than the prior art capacitor shown in FIG. 1.

Second Embodiment

Figure 3A:
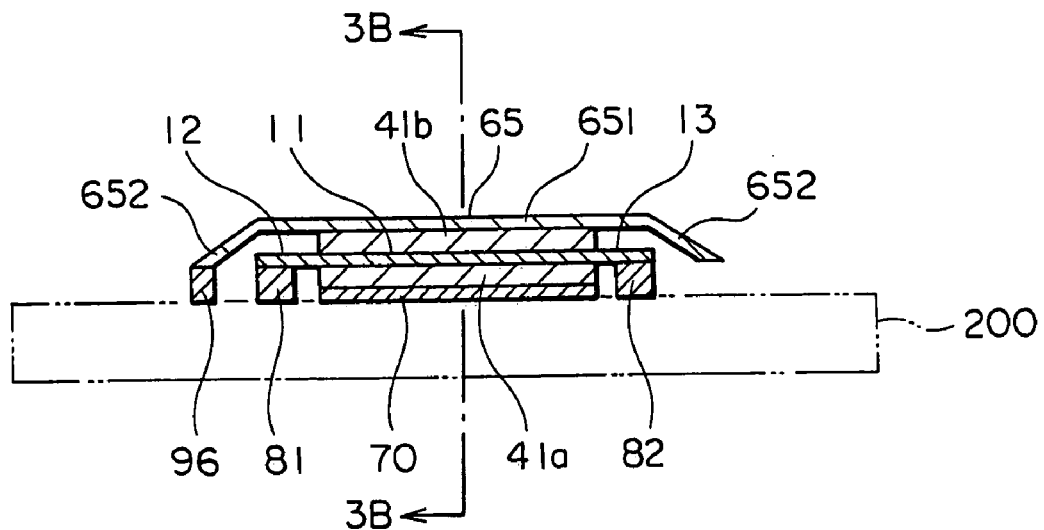
FIGS. 3A and 3B are a longitudinal cross sectional view of a surface-mounting type capacitor according to a second embodiment of this invention and a transversal cross sectional view along a line 3B—3B of FIG. 3A, respectively.
Figure 3B:
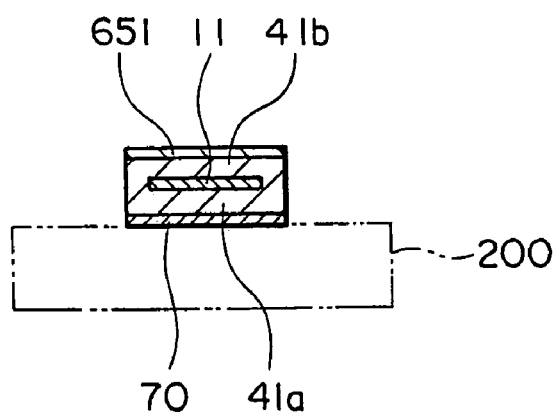

Referring to FIGS. 3A and 3B, a surface-mounting type capacitor according to a second embodiment of this invention differs from the first embodiment of FIGS. 2A and 2B in that a metal plate 65 is provided with a single additional terminal. Therefore, the same elements will be denoted by like reference numerals and omitted in detailed description, and the description will be made mainly of different elements.

The surface mount type capacitor of the second embodiment comprises an additional terminal 96 electrically connected to the lower side of one end of the metal plate 65 in the length direction. The additional terminal 96 can be electrically connected to the ground pattern of the circuit board 200. A surface of the first anode terminal 81, the cathode terminal 70, and the additional terminal 96 are on a level with one another in the thickness direction.

The metal plate 65 is extended over the first and the second leads 12 and 13 and therefore covers the whole of the first and the second leads 12 and 13. Namely, the metal plate 65 has a substantially planar plate portion 651 and downward directed portions 652 respectively extended from the planar plate portion 651. Furthermore, one of the downward directed portions 652 is electrically connected to the additional terminal 96 which can be electrically connected to the ground of the circuit board 200. Consequently, the metal plate 65 can more sufficiently suppress or control the behavior of the propagation of the electromagnetic wave noise in the vicinity of the first and the second leads 12 and 13, than the prior art capacitor shown in FIG. 1.

Third Embodiment

Figure 4A:
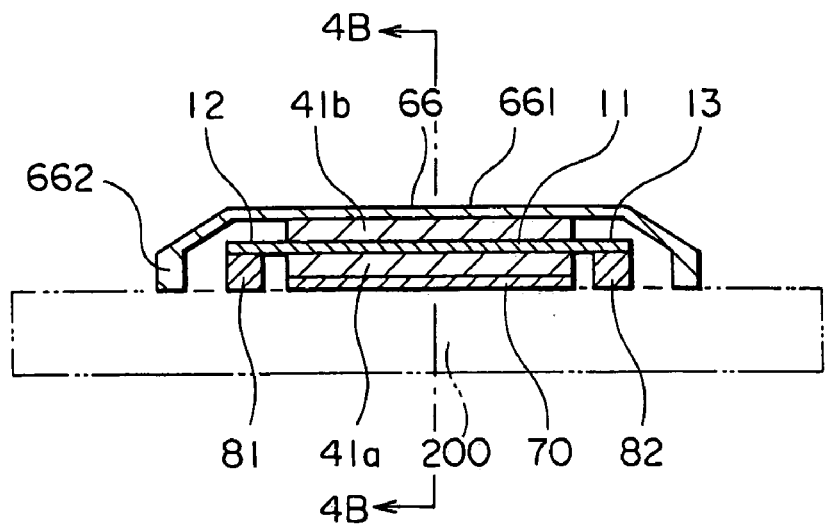
FIGS. 4A and 4B are a longitudinal cross sectional view of a surface-mounting type capacitor according to a third embodiment of this invention and a transversal cross sectional view along a line 4B—4B of FIG. 4A, respectively.
Figure 4B:
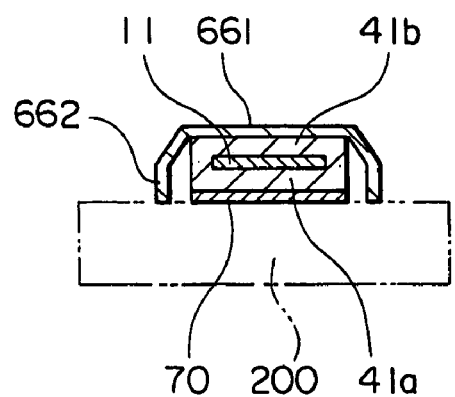

Referring to FIGS. 4A and 4B, a surface-mounting type capacitor according to a third embodiment of this invention comprises the same elements as those of the surface-mounting type capacitor of the first embodiment shown in FIGS. 2A and 2B. A main difference between the first and the third embodiments lies in a shape of a metal plate member. An explanation will be made of the difference.

The surface mount type capacitor of the second embodiment comprises a metal member, or metal plate, 66 made of copper. The metal plate 66 is electrically connected to an upper surface of the upper cathode portion 41b. The metal plate 66 is longer than the length of the anode section. Furthermore, the metal plate 66 is wider than the width of the anode section in the width direction as shown in FIG. 2B.

The metal plate 66 is extended over the first and the second leads 12 and 13 in the length and the width directions. Therefore, the metal plate 66 completely covers the whole of the first and the second leads 12 and 13. Namely, the metal member 66 has a substantially planar plate portion 661 and a downward directed portions 662 extended from the planar plate portion 661. Furthermore, the downward directed portions 662 serve as additional terminals. The additional terminals correspond to the first and the second additional terminals 91 and 92 of the first embodiment shown in FIGS. 2A and 2B or the additional terminals 96 of the second embodiment shown in FIGS. 3A and 3B. Consequently, the downward directed portions 662 can be electrically connected to the ground of the circuit board 200. Thus, the metal plate 66 can more sufficiently suppress or control the behavior of the propagation of the electromagnetic wave noise in the vicinity of the first and the second leads 12 and 13.

Because the metal member 66 completely covers the first and the second leads 12 and 13 in the length and the width directions, the capacitor of the third embodiment can more sufficiently suppress or control the behavior of the propagation of the electromagnetic wave noise, compared with the first embodiment shown in FIGS. 2A and 2B and the second embodiment shown in FIGS. 3A and 3B.

To show the effectiveness of the preset invention, transmission characteristics of the capacitors according to the first and the second embodiments have been measured and compared with the prior art capacitor.

Figure 5:
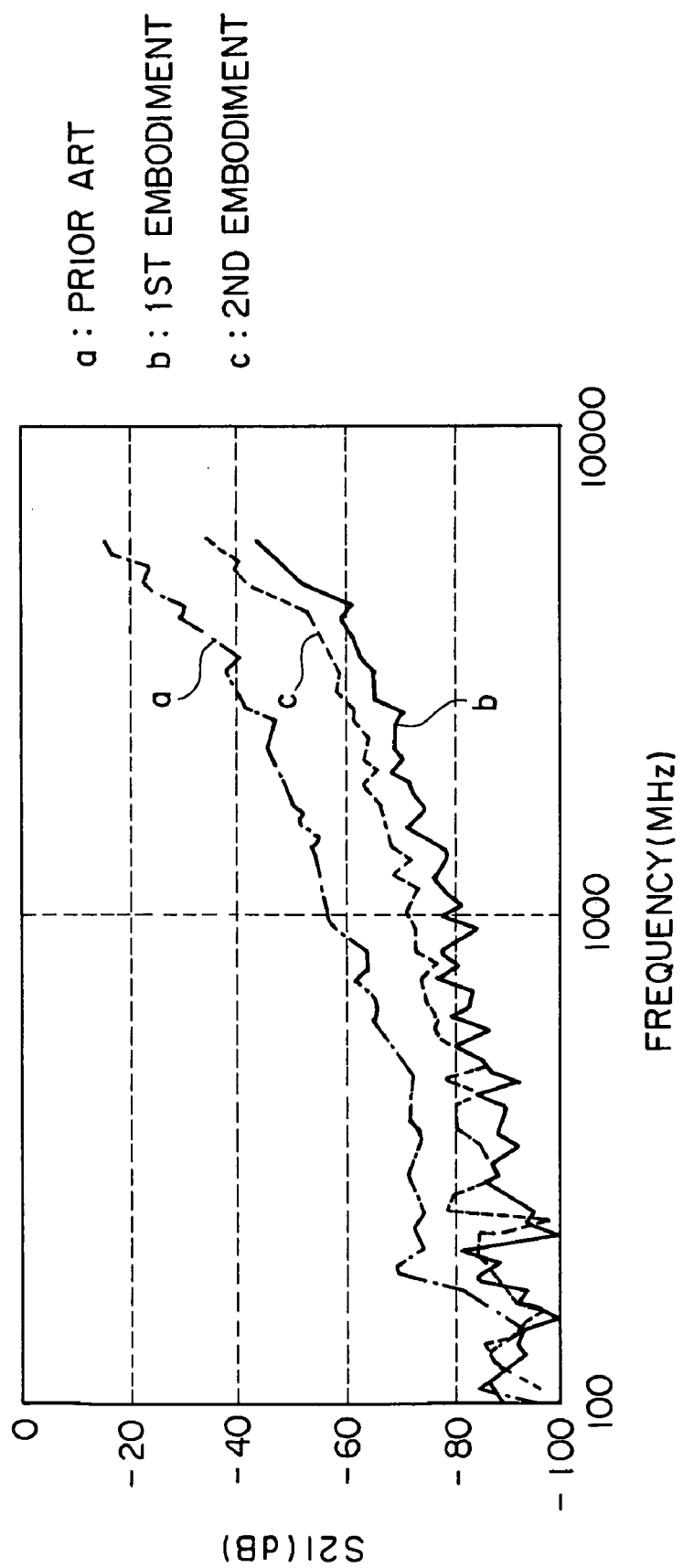
FIG. 5 is a line graph showing transmission attenuation performances by the surface-mounting type capacitors of the prior art and the first and the second embodiments, with respect to frequencies.

FIG. 5 shows transmission coefficient S21 versus frequency characteristics of the surface mount type capacitors of the prior art and the first and the second embodiments.

The transmission coefficient S21 is one of elements of a scattering matrix of the capacitors, and represents how much input frequency components appearing on the first anode terminal 81 are transmitted to the second anode terminal 82 including electromagnetic waves picked up by the second anode terminal 82 due to radiation from the first anode terminal 81 and the first lead 11. That is, the lower the value of S21, more suppressed or controlled the electromagnetic wave noise is.

The transmission coefficient S21 is measured by using a network analyzer which is electrically connected, through SMA (Sub Miniature type A) connectors, to input and output ports of the circuit board 200 which are electrically connected to the first and the second anode terminals 81 and 82, respectively. The network analyzer can measure the transmission coefficient S21 with a frequency region from 30 kHz to 6 GHz.

Each capacitor's specification is as follows:

| | |
|---|---|
| anode section | aluminum made, 13 mm wide and 15 mm long |
| metal plate | copper made, 13 mm wide and having a length sufficient to cover the anode section |
| first and second anode terminal | copper made, 13 mm wide and 1 mm long |
| additional terminal | copper made, 13 mm wide and 1 mm long |

In FIG. 5, lines a, b, and c represent the transmission coefficients S21 of the prior art capacitor, the capacitor of the first embodiment, and the capacitor of the second embodiment, respectively. As will be apparent from FIG. 5, the capacitors of the first and the second embodiments attenuate the electromagnetic wave noise than the prior art capacitor. Although the capacitor of the first embodiment most attenuates the electromagnetic wave noise, the capacitor of the second embodiment also attenuates the electromagnetic wave noise effectively.

So far, the invention has been described in conjunction with several embodiments. However, the invention is not restricted to the embodiments mentioned above but may be modified in various manners by those skilled in the art within the scope of the invention. For example, the anode section may be of a cylindrical shape instead of the planar shape, and a cathode section may be cylindrical. Moreover, the aluminum anode and the aluminum oxide may be replaced by tantalum and tantalum oxide, respectively. Moreover, a metal member is not limited to the above-mentioned shapes, but may be of a shape capable of providing shielding effects effectively.

What is claimed is:

1. A surface mount type capacitor comprising:
    an anode section having an anode portion and first and second leads;
    first and second anode terminals electrically connected to said first and said second leads, respectively;
    a cathode section including a cathode portion opposed to a dielectric layer formed on said anode portion;
    a cathode terminal electrically connected to said cathode portion;
    a metal member formed on said cathode portion in such a manner that said metal member covers an entire upper surface of said cathode portion; and
    an additional terminal electrically connected to said metal member and to be grounded to an object to which said surface mount type capacitor is to be mounted.

2. The surface mount type capacitor according to claim 1, wherein said metal member is arranged to cover said first and said second leads and said first and said second anode terminals.

3. The surface mount type capacitor according to claim 1, wherein said additional terminal includes first and second additional terminals, each disposed in a length direction and electrically connected to each of opposite ends of said metal member.

4. The surface mount type capacitor according to claim 1, wherein said metal member has a substantially planar plate portion and downward directed portions extended from said substantially planar plate portion.

5. The surface mount type capacitor according to claim 4, wherein said downward directed portions are formed at each of opposite ends of said substantially planar plate portion in a length direction of said substantially planar plate portion.

6. The surface mount type capacitor according to claim 5, wherein additional downward directed portions are formed at each of opposite sides of said substantially planar plate portion in a width direction perpendicular to said length direction of said substantially planar plate portion.

7. The surface mount type capacitor according to claim 4, wherein said downward directed portions serve as said additional terminal.

8. The surface mount type capacitor according to claim 1, wherein said cathode terminal is to be grounded to the object to which said surface mount type capacitor is to be mounted.

9. The surface mount type capacitor according to claim 1, wherein said first and said second anode terminals, said cathode terminal, and said additional terminal have mounted-surfaces, said mounted-surfaces being on a level with one another.

* * * * *